United States Patent [19]
Fedor

[11] Patent Number: 4,752,163
[45] Date of Patent: Jun. 21, 1988

[54] THREAD CUTTING DIESTOCK ASSEMBLY

[75] Inventor: Gregory R. Fedor, Bay Village, Ohio

[73] Assignee: Emerson Electric Co., St. Louis, Mo.

[21] Appl. No.: 46,099

[22] Filed: May 5, 1987

[51] Int. Cl.$^4$ .................. B23B 45/12; B23G 1/30
[52] U.S. Cl. .................. 408/123; 408/239 R; 10/111; 10/123 R; 403/326; 403/377
[58] Field of Search .................. 10/111, 123 R, 123 P, 10/123 S; 408/120, 123, 215, 221, 239 R; 279/1 B; 403/327, 326, 377

[56] References Cited

U.S. PATENT DOCUMENTS

| | | | |
|---|---|---|---|
| 858,892 | 7/1907 | Moss | 81/57 |
| 1,395,888 | 11/1921 | Ayotte | 145/66 |
| 1,450,211 | 4/1923 | Kopp | 10/123 R |
| 2,004,639 | 6/1935 | Thewes | 10/124 |
| 2,255,009 | 9/1941 | Ingwer | 10/124 |
| 3,079,188 | 2/1963 | Oswold | 403/377 |
| 3,097,871 | 7/1963 | McNally | 403/326 |
| 3,187,610 | 6/1965 | Russman | 81/185 |
| 3,347,293 | 10/1967 | Clask | 403/326 |
| 4,195,944 | 4/1980 | Cross | 403/326 |
| 4,213,723 | 7/1980 | Wagner | 408/239 |
| 4,575,048 | 3/1986 | Bregman et al. | 403/326 |

FOREIGN PATENT DOCUMENTS

610640 10/1948 United Kingdom ............ 10/123 R

*Primary Examiner*—Gil Weidenfeld
*Assistant Examiner*—Daniel W. Howell
*Attorney, Agent, or Firm*—Body, Vickers & Daniels

[57] ABSTRACT

A thread cutting diestock assembly is disclosed comprising a ratchet housing having a bore adapted to selectively and detachably receive a large thread cutting die head or an adaptor ring, each of which is provided with ratchet teeth engaged by a pawl on the ratchet housing so as to be rotatably therewith. The adaptor ring has a polygonal bore adapted to detachably receive a small thread cutting die head which interengages with the polygonal bore to preclude relative rotation between the die head and adaptor ring. A circumferentially extending recess in the bore in the ratchet housing carriers a non-circular split retaining spring ring which interengages with the large die head or adaptor ring to detachably secure the latter in the ratchet housing bore, and a circumferentially extending groove in the adaptor ring bore carries a polygonal split retaining spring ring which interengages with the smaller die head to detachably secure the latter in the adaptor ring bore.

43 Claims, 3 Drawing Sheets

THREAD CUTTING DIESTOCK ASSEMBLY

BACKGROUND OF THE INVENTION

This invention relates to the art of thread cutting tools and, more particularly, to improvements in connection with thread cutting diestock assemblies of the character comprising a rotatable head member and thread cutting tools detachably associated therewith.

The present invention finds particular utility in connection with diestock assemblies wherein the head member and detachable tools cooperatively define a ratchet and pawl arrangement by which the thread cutting tools are driven in response to rotation of the head and, accordingly, the invention will be described in detail in conjunction with such a ratchet and pawl drive arrangement. At the same time, however, it will be appreciated that the invention is applicable to the detachable inter-engagement of tools and heads wherein the tools are driven other than by a ratchet and pawl arrangement.

Diestock assemblies comprising a head in the form of a ratchet housing for detachably receiving thread cutting die heads are of course well known and advantageously provide a rotatable thread cutting tool capable of cutting threads on a variety of different size workpieces such as pipes and rods. Such diestock assemblies are shown, for example, in U.S. Pat. No. 2,004,639 to Thewes, and U.S. Pat. No. 4,213,723 to Wagner. In Thewes, each of a set of die heads is detachably received in a driven ratchet ring mounted in the ratchet housing and in Wagner, the ratchet housing is adapted to directly drive either a first set of die heads or an adaptor ring, each of which is detachable received therein, and the adaptor ring is adapted to detachably receive and drive a second set of die heads, whereby a single ratchet housing accommodates thread cutting die heads for cutting threads on a wider variety of sizes of workpieces. The exterior of the ratchet ring in Thewes and the exteriors of the adaptor ring and large die head in Wagner are provided with ratchet teeth engaging a pawl carried in the ratchet housing, whereby the ratchet ring, adaptor ring or large die head is rotated in response to displacement of the ratchet housing in the direction to drivingly engage the pawl and teeth. The bores in the ratchet ring and adaptor ring are of polygonal cross-section to receive a correspondingly contoured part of the die head received therein, whereby the latter is rotated with the ratchet ring or adaptor ring.

Heretofore, as will be seen in the Thewes and Wagner patents, detachability between the ratchet housing and the adaptor ring or large die head is achieved through the use of a circular split retaining spring ring which is generally rectangular in cross-section, and detachability between the die head and the ratchet ring or adaptor ring is achieved through the use of a circular split retaining spring ring which is circular in cross-section. In connection with the retaining ring in Wagner by which the adaptor ring or large die head is detachably secured in the ratchet housing, the retaining ring is carried in an annular recess or groove in the removable part and engages the latter against a shoulder in the ratchet housing, and in connection with the retaining rings in Thewes and Wagner by which a die head is detachably secured in the polygonal bore in the ratchet ring or adaptor ring, the retaining ring is carried in an annular recess or groove in the polygonal bore. Portions of the latter retaining ring span the corners between adjacent wall portions of the bore, and the spanning portions are engaged and radially outwardly displaced by corners on the polygonal coupling portion of the die head during movement of the die head into the bore. The retaining ring then constricts into a groove therefor in the die head to detachably secure the latter in place.

A number of problems and disadvantages are attendant to the use of such retaining ring arrangements heretofore provided. In this respect, with regard to the retaining ring between the ratchet housing and adaptor ring of Wagner, the retaining ring must be pried from the recess in which it is carried, through the use of an appropriate tool, in order to separate the large die head or adaptor ring from the ratchet housing, and the ring must then be reassembled with respect to the component which replaces the removed component. Thus, the removing and reassembling operations are time consuming, and the separation of the retaining ring by prying and the replacement thereof each time a part is to be interchanged with the ratchet housing necessarily imposes undesirable stresses on the ring and wearing engagement between the surfaces of the parts. With regard to the retaining ring between the ratchet ring or adaptor ring and the smaller die heads, extreme accuracy in the unexpanded diameter of the ring is required to assure adequate retention of the die head in the adaptor or ratchet ring bore and to preclude jamming therebetween. In this respect, if the retaining ring diameter is on the large side it will not sufficiently retain the die head against axial separation from the ring and, if the retaining ring diameter is on the small side, it can shift laterally and/or circumferentially relative to the recess or groove in which it is carried such that the ring is misaligned with the axis of the bore and/or the ends of the spring are exposed radially inwardly of the ratchet ring or adaptor ring bore. Either of these conditions results in impeding introduction of the die head past the spring, and exposure of the spring ring ends can cause displacement of the retaining ring out of its groove or recess by the die head. Moreover, exposure of the ends of the retaining ring radially inwardly of the adaptor ring bore can result in jamming of the die head when assembled therewith, thus making separation of the die head difficult and subjecting the coupling portion thereof to damage.

SUMMARY OF THE INVENTION

In accordance with the present invention, retaining ring structures are provided by which the foregoing disadvantages and others of retaining ring arrangements heretofore used are advantageously overcome or minimized. More particularly, and in accordance with one aspect of the invention, a retaining ring structure is provided which assures the necessary structural integrity with respect to retention of a detachable large die head, ratchet ring or adaptor ring relative to a tool head such as a ratchet housing, while enabling removal of the detachable component without any tools and without removal of the retaining ring. Accordingly, the assembly and disassembly operation is simplified and more efficient. In this respect, assembly and disassembly time is minimized, and handling of the retaining ring in connection with a part changing operation is avoided. Further, undesirable stressing of the ring and undesirable wearing of the parts by the repeated separation and reassembly of the retaining ring relative thereto is also advantageously avoided.

In accordance with another aspect of the invention, a retaining ring is provided between a ratchet ring or adaptor ring bore and a die head detachably received therein which, in cooperation with the groove or recess carrying the retaining ring, is restrained to be centrally positioned in the bore so as to facilitate the ease of assembly and disassembly while eliminating accidental removal of the ring from its groove or recess and/or jamming of the die head in the ratchet or adaptor ring. These advantages are achieved while assuring a more consistent holding or retention force with respect to the die head with less demand for close tolerances in manufacture.

More particularly in accordance with the present invention, the foregoing advantages are achieved by a split retaining spring ring between a ratchet housing and a driven member, such as a die head, ratchet ring or adaptor ring, and which retaining ring is non-circular in its circumferential contour so as to provide first portions engaging the bottom of the recess in which the retaining ring is carried and second portions between the first portions and exposed radially inwardly of the ratchet housing bore so as to be engaged and displaced radially outwardly by the die head, ratchet ring or adaptor ring when the latter is introduced into the ratchet housing bore. The second portions are received in a recess in the outer surface of the ratchet ring, die head or adaptor ring to secure the latter in the ratchet housing bore, and the first portions support the retaining ring in a manner which provides for the latter to be relatively stiff, thus providing adequate retention force for the die head, ratchet ring or adaptor ring while enabling separation of the latter from the housing by axial pressure on an extended portion of the detachable part. Preferably, the outside diameter of the retaining spring ring is greater than the diameter of the recess therefor in the ratchet housing bore so that the spring ring is supported in the recess in compression. This assures engagement of the first portions of the retaining ring with the bottom of its recess, centering of the retaining ring relative to the ratchet housing bore, and stability of the retaining ring against rattling.

The advantages referred to above in connection with the retaining ring between the ratchet ring or adaptor ring and the smaller die heads are achieved by a retaining ring and groove arrangement including a split retaining spring ring which is non-circular in its circumferential contour and which interengages with the groove in which it is carried such that the retaining ring is restrained against lateral and circumferential displacement relative to the ratchet ring or adaptor ring bore. More particularly in this respect, the interengaging support between the retaining ring groove and the retaining ring provides for the latter to be self-centering relative to the bore and assures a positioning of the ends of the retaining ring which precludes exposure thereof radially inwardly of the bore and thus avoids potential interference with the die head during introduction thereof into the ratchet ring or adaptor ring bore. When received in its groove, the retaining ring has portions spanning diametrically opposed corners of the polygonal ratchet or adaptor ring bore, radially inwardly of the corners, for engagement and radial outward displacement by corresponding corners on the coupling portion of the die head when the latter is inserted into the bore. Preferably, the retaining ring is supported in its groove in tension to assure the desired centering while eliminating rattle and the need to accurately control the free state dimensions of the retaining ring. The portions of the retaining ring spanning corners of the ratchet or adaptor ring bore engage in recesses in the coupling portion of the die head and provide adequate retention force for the die head while facilitating the ease of removal thereof by the application of axial pressure to the die head.

It is accordingly an outstanding object of the present invention to provide improvements in connection with the detachable retention of driven members of a diestock assembly relative to one another and/or to a rotatable head member of the diestock assembly.

Another object is the provision of an improved retaining ring arrangement between the bore of a head member of a diestock assembly and a driven member detachably secured in the bore.

A further object is the provision of an improved retaining ring arrangement between the bore of a driven member of a diestock assembly and a thread cutting die head detachably secured in the bore of the driven member.

Yet another object is the provision of improved retaining ring arrangements between a ratchet housing of a diestock assembly and a plurality of different driven members including an adaptor ring selectively mountable in the housing, and between such an adaptor ring and thread cutting die heads detachably received therein.

Still another object is the provision of retaining ring arrangements of the foregoing character which provide for improved efficiency with respect to the assembly and disassembly of component parts of a diestock assembly while providing adequate retention force against unintended separation of the detachably interengaged parts.

Yet a further object is the provision of a retaining ring between a ratchet housing and driven member which is non-circular in circumferential configuration and includes portions engaging the bottom of a recess therefor in the ratchet housing bore and portions exposed radially inwardly of the bore and which are engaged and displaced radially outwardly by the driven member to facilitate the introduction, detachable retention and removal of the driven member from the housing bore.

Still a further object is the provision of a retaining ring between the polygonal bore of a driven member and a thread cutting die head received therein and which retaining ring is non-circular in circumferential configuration and includes portions interengaging with a groove therefor in the retaining ring bore to preclude lateral and circumferential displacement thereof relative to the bore, and including portions spanning diametrically opposed corners of the bore radially inwardly thereof and which spanning portions are engaged and displaced radially outwardly by the coupling portion of a die head introduced into the driven member bore, thus to facilitate introduction, detachable retention and removal of the die head therefrom.

Still another object is the provision of retaining ring arrangements of the foregoing character wherein the retaining rings are self-centering relative to the corresponding bore, minimize requirements for close tolerances with respect to the dimensions thereof, and are supported in the corresponding recess or groove to preclude rattling interengagement therebetween.

BRIEF DESCRIPTION OF THE DRAWINGS

The foregoing objects, and others, will in part be obvious and in part point out more fully hereinafter in conjunction with the written description of preferred embodiments of the invention illustrated in the accompanying drawings in which:

FIG. 1 is an exploded perspective view of component parts of a diestock assembly including retaining spring rings in accordance with the present invention;

BRIEF DESCRIPTION OF THE DRAWING

Figures 1, 6:
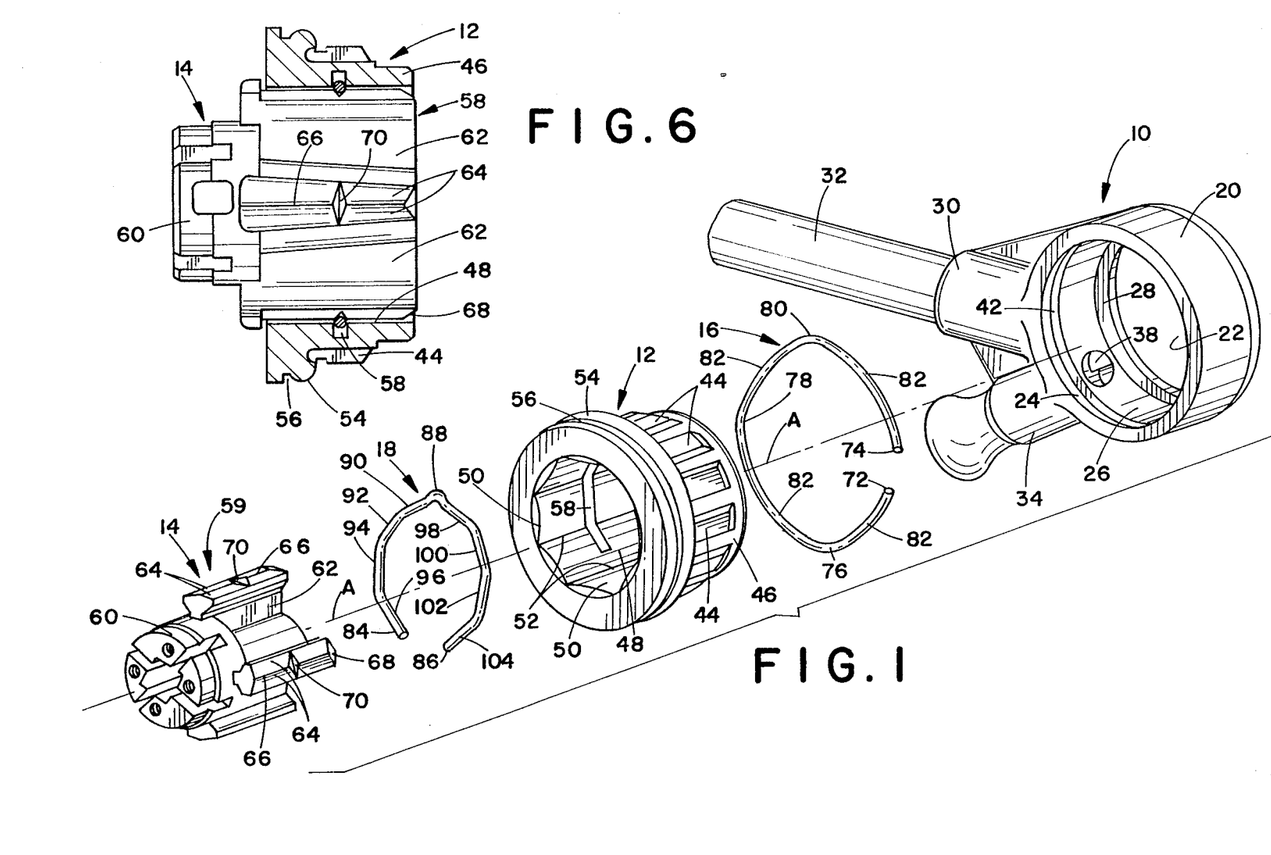
Figure 2:
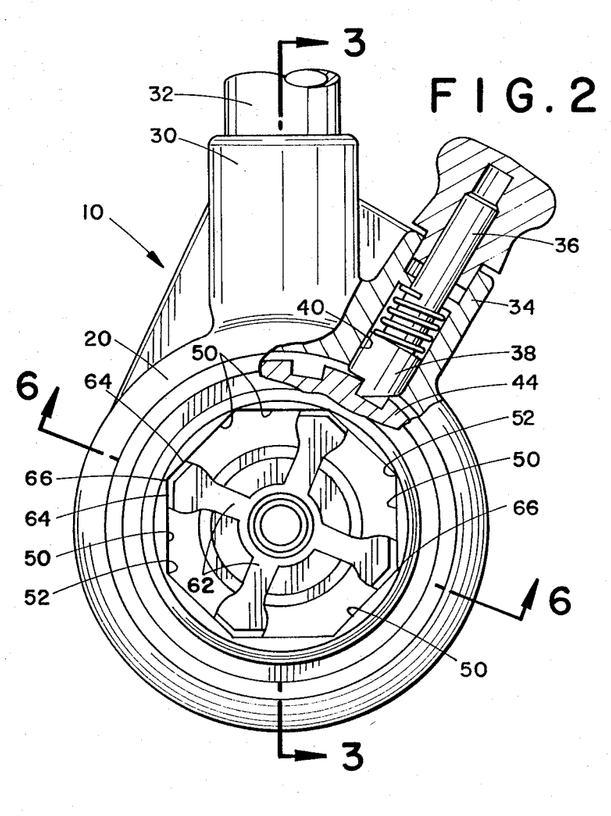
FIG. 2 is an end elevation view, partially in section, showing the component parts in assembled relationship.
Figure 3:
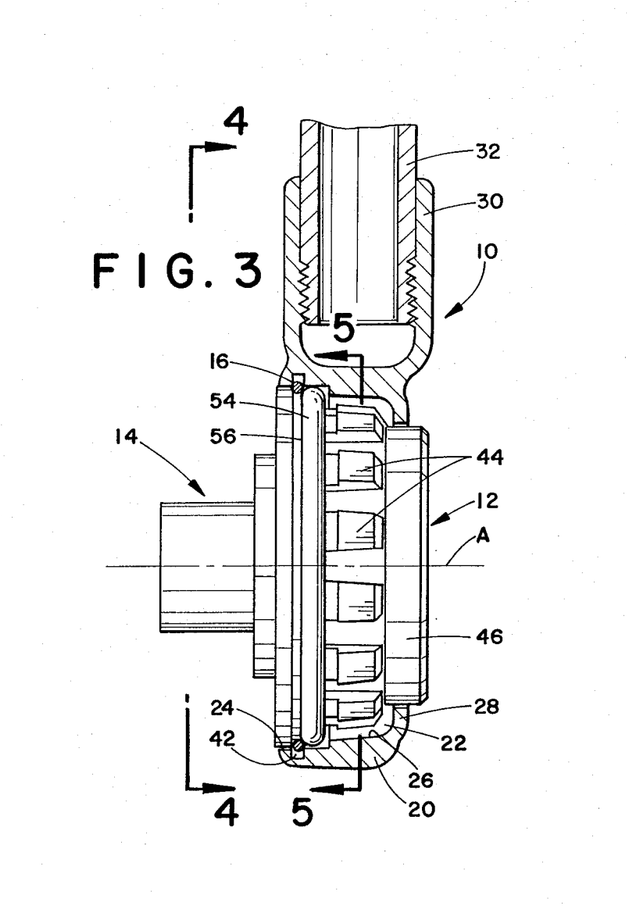
FIG. 3 is a sectional elevation view of the assembly taken along line 3—3 in FIG. 2.

With reference now in particular to the drawing wherein the showings are for the purpose of illustrating preferred embodiments of the invention only and not for the purpose of limiting the invention, FIGS. 1-3 illustrate a diestock assembly comprising a head assembly 10, a driven member 12 and a thread cutting die head 14. As set forth more fully hereinafter, driven member 12 and head assembly 10 are detachably interengaged by means of a resilient, split retaining spring member 16, and die head 14 and driven member 12 are detachably interconnected by means of a resilient, split retaining spring member 18. In the embodiment shown, head assembly 10 includes a ratchet housing 20 having a circular bore 22 therethrough providing the ratchet housing with an axis A, with an inner wall including axially adjacent circular wall portions 24 and 26, and with a radially inwardly extending flange 28 at one end of the housing. The ratchet housing includes a radially extending portion 30 adapted to receive a handle 32 suitably interengaged therewith such as by threading and which provides for the head assembly to be manually rotated about axis A. Housing 20 further includes a radially extending portion 34 reciprocably supporting a spring biased pawl 36 having a radially inner end 38 projecting through an opening 40 in wall portion 26 and thus into the ratchet housing bore for driving engagement with driven member 12 when the latter is assembled with the ratchet housing. Wall portion 24 of bore 22 in the ratchet housing is provided with a circumferentially continuous annular recess or groove 42 which, as set forth more fully hereinafter, receives and carries retaining ring 16 by which driven member 12 is detachably secured in ratchet housing bore 22.

Driven member 12 is an annular member axially receivable in bore 22 and provided about its outer periphery with ratchet teeth 44 adapted to interengage with inner end 38 of pawl 36 as shown in FIG. 2. As is well known, pawl end 38 is contoured for displacement of ratchet housing 20 counterclockwise in the latter Figure causing driven member 12 to rotate therewith about axis A, and for displacement of ratchet housing 20 in the clockwise direction in FIG. 2 to provide for pawl end 38 to ride over teeth 44 and thus relative to the driven member. As is further well known, pawl 36 is rotatable in extension 34 to reverse the position of end 38 and thus reverse the foregoing driving direction of member 12. In the embodiment shown, driven member 12 is in the form of an adaptor ring having a bore 48 therethrough coaxial with axis A when the driven member is assembled with ratchet housing 20. Bore 48 is of polygonal cross-sectional configuration and, in the preferred embodiment, is comprised of eight planar inner wall portions 50. Circumferentially adjacent ones of the wall portions 50 intersect along lines 52 to provide corners therebetween, which corners are disposed in diametrically opposed pairs with respect to axis A. The outer periphery of driven member 12 includes a circumferentially continuous shoulder 54 axially adjacent ratchet teeth 44 toward one end of the driven member, and a circumferentially continuous annular recess or groove 56 is provided adjacent shoulder 54 in the direction toward the one end of the driven member. Recess 56 is adapted to interengage with retaining ring 16 to detachably secure driven member 12 in the ratchet housing and, for the purpose set forth hereinafter, the outer surface of shoulder 54 is preferably rounded along its axially opposite edges relative to recess 56. Bore 48 of driven member 12 is provided with a circumferentially extending groove 58 having a preferred configuration described hereinafter and which is adapted to carry retaining ring 18 by which thread cutting die head 14 is detachably secured in driven member 12.

Die head 14 is representative of a number of die heads adapted to be detachably secured in bore 48 of driven member 12 to enable the cutting of threads on workpieces having different diameters. In this respect, as is well known, die head 14 includes a mounting or coupling portion 59 and a head portion 60 in which thread cutting chasers, not shown, are supported. In the embodiment illustrated, coupling portion 59 is defined by diametrically opposed pairs of radially extending legs 62 each of which terminates in an outer end comprising a pair of angularly related surfaces 64 engaging to provide an edge 66 therebetween. Each pair of surfaces 64 and the edge 66 therebetween provide an outwardly facing corner corresponding in contour to the corners between adjacent wall portions 50 of bore 48 in driven member 12. Accordingly, it will be appreciated that when die head 14 is received in bore 48, relative rotation between the die head and driven member is precluded. For purposes set forth hereinafter, the axially outer ends of each pair of surfaces 64 are tapered as indicated by numeral 68, and each pair of surfaces 64 is further provided with a generally V-shaped notch 70 extending circumferentially thereacross.

Figure 4:
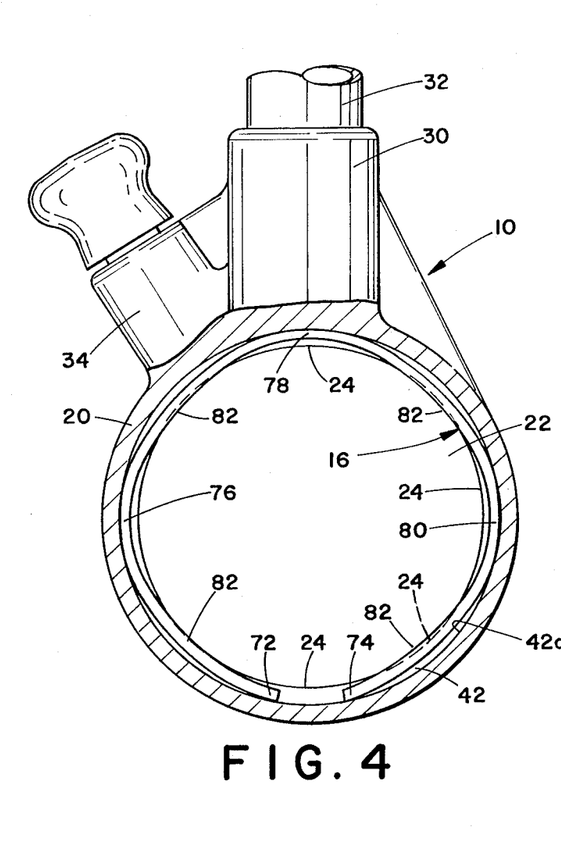
FIG. 4 is an end elevation view, partially in section, of the ratchet housing as seen in the direction of line 4—4 in FIG. 3.

Referring now in particular to FIGS. 1, 3 and 4 of the drawing, retaining ring 16 by which driven member 12 is detachably secured to ratchet housing 20 in accordance with the present invention is a split ring preferably constructed from round spring steel wire and having a non-circular contour between its circumferentially opposite ends 72 and 74. More particularly, with regard to the non-circular contour, ring 16 is comprised of lobes 76, 78 and 80 between ends 72 and 74 and having a radius of curvature smaller than that of recess 42 in which the retaining ring is carried, and arcuate legs 82 between lobes 76, 78 and 80 and between lobes 76 and 80 in the corresponding one of the ring ends 72 and 74. Lobes 76 and 80 are diametrically opposite one another and equidistant from lobe 78, and lobe 78 is diametrically opposite a point midway between ends 72 and 74 of the retaining ring. Recess 42 in ratchet housing 20 has a bottom wall 42a, and retaining ring 16 has a dimension between lobes 76 and 80 and between lobe 78 and ring ends 72 and 74 which provides for the lobes and ring ends to engage bottom 42a of recess 42 when the ring is in place in the recess. Further, arcuate legs 82 have a radius of curvature which provides for portions of the legs between the lobes and ring ends to be exposed radially inwardly of inner wall portion 24 of bore 22 and to be spaced inwardly from the corresponding underlying portion of bottom 42a of recess 42, as best seen in FIG. 4. Accordingly, it will be appreciated that when driven member 12 is introduced into bore 22 of ratchet housing 20 in the direction from left to right in FIGS. 1 and 3, shoulder 54 on the driven member engages the radially inwardly exposed portions of legs 82 of retaining ring 16, whereby each of the exposed leg portions is cammed radially outwardly by the rounded surfaces on shoulder 54 to allow the shoulder to pass the retaining ring, after which the latter constricts and enters recess 56 adjacent shoulder 54 to secure the driven member in place. By providing for the lobes 76, 78 and 80 and ring ends 72 and 74 to engage bottom 42a of recess 42, the retaining ring is relatively stiff and each of the exposed portions of legs 82 is basically independently deflected relative to the lobes or to the lobes and ring ends at opposite ends thereof. As will be appreciated from FIG. 3, driven member 12 preferably has a portion 46 extending outwardly of ratchet housing 20 through the opening provided by flange 28. Separation of the driven member from the ratchet housing is readily achieved by applying axial pressure to portion 46 in the direction toward the opposite end of the assembly, whereby the rounded edges of shoulder 54 adjacent recess 56 cammingly engage and displace the portions of retaining ring legs 82 in the recess radially outwardly to allow shoulder 54 to pass the retaining ring in the disengaging direction. Preferably, ring 16 in its unmounted disposition is of a diameter larger than that of bottom 42a of recess 42, whereby the ring is supported in recess 42 in compression so as to positively force the lobes and ring ends against the bottom of the recess. This advantageously serves to maintain the retaining ring in generally concentric relationship with respect to axis A and to provide an anti-rattling interengagement between the retaining ring and recess. As an example in connection with a ratchet housing recess in which the bottom has a diameter of about 3.6 inch, a suitable retaining ring member can be constructed from 0.080 diameter oil tempered spring steel ASTM-A229. The recess has a depth of about 0.1 inch, the lobes have a radius of curvature of about 1.0 inch and the arcuate contour of legs 82 provides for the exposed portions thereof to have a maximum extension of about 0.05 inch into bore 22.

Figure 5:
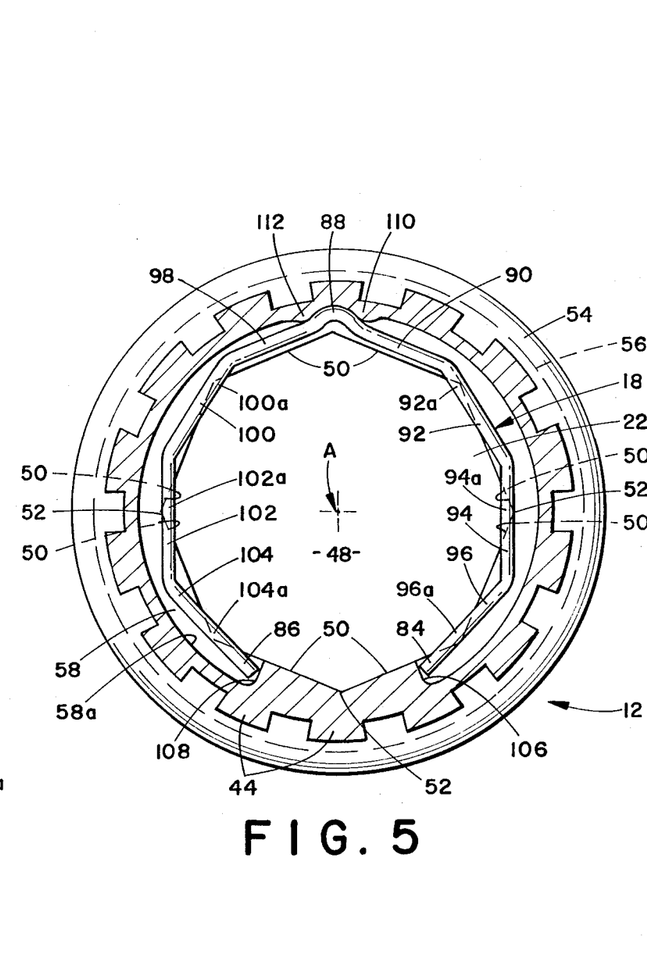
FIG. 5 is a cross-sectional elevation view of the adaptor ring taken along line 5—5 in FIG. 3; and, FIG. 6 is a sectional elevation view of the adaptor ring and thread cutting die head assembled therewith, taken along line 6—6 in FIG. 2.

With reference now in particular to FIGS. 1, 5 and 6 of the drawing, retaining ring 18 by which die head 14 is detachably secured in driven member 12 is a split spring ring preferably constructed from round wire. Ring 18 has a structure and a structural interrelationship with groove 58 in driven member 12 which precludes circumferential displacement of the ring relative to the groove while providing for radial expansion of the ring to achieve detachable interengagement with die head 14. More particularly in this respect, ring 18 has opposite ends 84 and 86, and a projection 88 diametrically opposite a point midway between ends 84 and 86. The ring is symmetric with respect to a line through projection 88 and the midpoint between ends 84 and 86 and, in this respect, includes linear angularly related legs 90, 92, 94 and 96 between lobe 88 and end 84, and respectively corresponding linear angularly related legs 98, 100, 102 and 104 between lobe 88 and end 86. Groove 58 in driven member 12 is provided with circumferentially spaced apart surfaces 106 and 108 respectively providing abutments for ends 84 and 86 of retaining ring 18, and further includes circumferentially spaced apart shoulders 110 and 112 receiving projection 88 therebetween. It will be appreciated that this configuration provides for spring 18 to be supported in groove 58 against lateral and circumferential displacement relative thereto about axis A. Further, as best seen in FIG. 5, surfaces 106 and 108 and shoulders 110 and 112 are oriented relative to walls 50 of bore 48 such that portions of legs 92, 94, 96, 100, 102 and 104 of the retaining ring span the corners between adjacent bore walls 50 so as to be exposed radially inwardly of the corners. Such spanning portions of the latter legs are identified in FIG. 5 by the character a associated with the numeral representing the leg. Accordingly, it will be appreciated that upon introduction of mounting portion 59 of die member 14 into bore 48 of driven member 12, from left to right in FIG. 1, tapered surfaces 68 on diametrically opposed ones of the legs 62 of the die member will engage diametrically opposed ones of the corner spanning portions of the retaining ring legs to deflect the latter and thus ends 84 and 86 of the retaining ring radially outwardly of axis A. When notches 70 in mounting portion 59 of the die head reach the spanning leg portions, the ring constricts and interengages with notches 70 to detachably retain the die head in place.

Groove 58 has a bottom 58a having a diameter sufficient to permit the necessary radial expansion of retaining ring 18 during such interengagement between the coupling portion of the die head and the retaining ring, and it will be appreciated that separation of the die head from the driven member is achieved by the application of axial force against the outer end of mounting portion 69 and in the direction toward head 60. In connection with such disassembly, the V-shaped configuration of notches 70 provides for a camming engagement with the corner spanning portions of the spring ring legs to achieve displacement thereof radially outwardly into groove 59. As will be appreciated from FIG. 5, any mounting orientation between coupling portion 59 of die head 14 and bore 48 of driven member 12 provides for at least one diametrically opposed pair of surfaces 64 on legs 62 of the die head to interengage with a diametrically opposed pair of corner spanning portions of the spring legs so as to achieve detachable interengagement between the die head and driven member. In connection with a driven member having an eight sided bore measuring approximately 2.08 inches across diametrically opposed walls 50 of the bore, a satisfactory split retaining spring ring can be constructed from 0.090 diameter music wire. ASTM-A228. The wire is bent for the mounted configuration as shown in FIG. 5 to provide for legs 94 and 102 to be parallel to one another and spaced apart between their radially outermost edges about 2.21 inch and for legs 96 and 104 to be inclined relative thereto at an angle of about 45°. The interior angle between legs 90 and 98 is about 136°, the interior angle between legs 90 and 92 and between legs 98 and 100 is about 145°, and the interior angle between legs 92 and 94 and between legs 100 and 102 is about 147°. Surfaces 106 and 108 of groove 58 are spaced apart about 0.94 inch, and the included angle therebetween is about 45°. The free state space between leg ends 84 and 86 is about 0.82 inch.

Retaining ring 18 and its supporting structure advantageously eliminate the need for close tolerances for the retaining ring groove. Further, abutment surfaces 106 and 108 are preferably inclined relative to recess bottom 58a in a converging relationship which provides for the planes thereof to intersect above axis A in FIG. 5. This provides for the surfaces to interengage with spring ends 84 and 86 in a manner which urges the spring 18 upwardly in FIG. 5 and thus urges projection 88 radially outwardly against the recess between shoulders 110 and 112. This advantageously promotes maintaining spring 18 in concentric relationship with respect to axis A and against a displacement relative to groove 58 which would cause rattling of the ring. Still further, such centering and interengagement is preferably further promoted by providing for ring 18 in its free state to have less space between ends 84 and 86 than is provided between surfaces 106 and 108, whereby the spring is expanded and supported in tension when mounted in recess 58. The latter also advantageously avoids encountering free state dimension changes in the spring ring resulting from repeated expansions thereof during use and, accordingly, eliminates the need to accurately control the initial free state dimension of the spring ring.

While considerable emphasis has been placed herein on the fact that driven member 12 is an adaptor ring adapted to detachably support thread cutting die heads, it will be appreciated that the detachable connection between the adaptor ring and ratchet housing advantageously provides for the ratchet housing to selectively receive and support either such an adaptor ring or large thread cutting die heads which, while not illustrated, have a mounting and drive portion structurally similar to that of the adaptor ring. More particularly in this respect, such larger die heads have ratchet teeth corresponding to ratchet teeth 44 for engagement with the drive pawl, a recess corresponding to recess 56 for interengagement with retaining ring 16, and a shoulder corresponding to shoulder 54 to provide the necessary camming of the spring during engaging and disengaging operations. Basically, the only difference resides in the fact that the die head would have a bore in which thread chasers are supported rather than a bore to accommodate smaller die heads. It will be appreciated too that the adaptor or ratchet ring bore need not be eight sided and can be of any internal configuration providing at least two diametrically opposed corners to non-rotatably interengage the adaptor or ratchet ring and the die head received in the bore. Still further, while it is preferred as disclosed herein to provide for the ratchet housing to selectively received large thread cutting die heads or an adaptor ring which facilitates the mounting of smaller thread cutting die heads, it will be appreciated that the driven member herein described as an adaptor ring or large thread cutting die head could be a driven ratchet ring having a polygonal bore therethrough for detachably receiving thread cutting die heads and which ratchet ring might be mounted on the ratchet housing against detachment therefrom or so as to be detachable therefrom other than by the preferred retaining ring 16 disclosed therein. It will be appreciated too that while it is preferred to provide spring retaining ring 18 with linear legs having portions which span corners of the bore 48, other circumferential contours can be provided for the retaining ring and for the leg portions thereof. The foregoing and other modifications as well as other embodiments of the invention will be obvious or suggested from the preferred embodiments herein disclosed, whereby the foregoing descriptive matter is to be interpreted merely as illustrative of the present invention and not as a limitation.

Having thus described the invention, it is claimed:

1. A diestock assembly comprising head means having a bore for detachably receiving a driven member, said bore having an axis and inner wall means, a circumferentially extending recess in said inner wall means, said recess having a bottom, resilient retaining ring means in said recess, said retaining ring means including circumferentially spaced apart lobe means engaging said bottom of said recess, and leg means between said lobe means having portions spaced from said bottom and exposed radially inwardly of said inner wall means of said bore, and said driven member including recess means interengaging with said exposed portions of said leg means to detachably secure said driven member in said bore and cam means for displacing said exposed portions relative to said recess means in response to movement of said driven member into and out of said bore.

2. A diestock assembly according to claim 1, wherein said retaining ring means is a split spring ring having opposite ends engaging said bottom of said recess.

3. A diestock assembly according to claim 2, wherein said spring ring is in compression in said recess, whereby the resiliency of the spring ring biases said lobe means and said opposite ends against said bottom of said recess.

4. A diestock assembly according to claim 2, wherein said ends of said spring ring and said lobe means engage said bottom of said recess at diametrically opposite locations therein.

5. A diestock assembly according to claim 2, wherein said lobe means includes three lobes between said ends of said spring ring, one of said lobes being diametrically opposite said ends, and the other two of said lobes being diametrically opposite one another and equidistant from said one lobe.

6. A diestock assembly according to claim 5, wherein said spring ring is in compression in said recess, whereby the resiliency of the spring ring biases said lobe means and said opposite ends against said bottom of said recess.

7. A diestock assembly according to claim 6, wherein said leg means are arcuate in the direction between said opposite ends of said spring ring.

8. A diestock assembly comprising head means having a bore for detachably receiving a driven member, said bore having an axis and inner wall means, a circumferentially extending recess in said inner wall means, said recess having a bottom, resilient retaining ring means in said recess, said retaining ring means including circumferentially spaced apart lobe means engaging said bottom of said recess, and leg means between said lobe means having portions spaced from said bottom and exposed radially inwardly of said inner wall means of said bore, said driven member including means interengaging with said exposed portions of said leg means to detachably secure said driven member in said bore, said driven member being an adaptor ring having a bore for detachably receiving a cutting die head, said adaptor ring bore having an axis and inner wall means providing at least two diametrically opposed corners facing inwardly of said adaptor ring bore, a circumferentially extending groove in said inner wall means of said adaptor ring bore, radially expandable retaining ring means in said groove, means supporting said expandable ring means in said groove against rotation relative to said adaptor ring axis and for expansion radially outwardly thereof, said radially expandable ring means including portions spanning said at least two corners radially inwardly thereof, and said cutting die head including means interengaging with said spanning portions to detachably secure said cutting die head in said adaptor ring bore.

9. A diestock assembly according to claim 8, wherein said spanning portions of said expandable ring means are linear.

10. A diestock assembly according to claim 8, wherein said expandable ring means has circumferentially opposite ends and said means supporting said expandable ring means includes circumferentially spaced apart abutment means in said groove between said opposite ends.

11. A diestock assembly according to claim 10, wherein said means supporting said expandable ring means further includes interengaging means between said groove and said expandable ring means at a location circumferentially spaced from said opposite ends of said expandable ring means.

12. A diestock assembly according to claim 11, wherein said interengaging means between said groove and said expandable ring means includes circumferentially spaced shoulders in said groove and a projection on said ring means between said shoulders.

13. A diestock assembly according to claim 12, wherein said spanning portions of said expandable ring means are linear.

14. A diestock assembly according to claim 11, wherein said opposite ends of said expandable ring means are spaced apart by said abutment means in said groove for said expandable ring means to be supported in tension in said groove.

15. A diestock assembly according to claim 14, wherein said interengaging means between said groove and said expandable ring means is in a location diametrically opposite said abutment means, and said abutment means and said opposite ends of said expandable ring means interengage to urge said expandable ring means toward said location.

16. A diestock assembly according to claim 15, wherein said interengaging means between said groove and said expandable ring means includes circumferentially spaced shoulders in said groove and a projection on said ring means between said shoulders.

17. A diestock assembly according to claim 16, wherein said spanning portions of said expandable ring means are linear.

18. A diestock assembly comprising head means having a first bore for detachably receiving a driven adaptor ring, said first bore having an axis and first inner wall means, a circumferentially extending recess in said first inner wall means, said recess having a bottom, a first split retaining ring in said recess, said first ring having opposite ends and circumferentially spaced apart lobe means between said ends, said ends and said lobe means engaging said bottom of said recess, said first ring further including leg means between said ends and said lobe means, said leg means having portions spaced from said bottom of said recess and exposed radially inwardly of said first inner wall means, said adaptor ring including means interengaging with said exposed portions of said leg means to detachably secure said adaptor ring in said first bore, said adaptor ring having a second bore for detachably receiving a cutting die head, said second bore being coaxial with said first bore and having polygonal second inner wall means providing at least two diametrically opposed corners facing inwardly of said second bore, a circumferentially extending groove in said second inner wall means having circumferentially spaced apart ends providing abutment means in said groove, a second split retaining ring in said groove having opposite ends receiving said abutment means therebetween, means including said abutment means supporting said second ring in said groove against rotation relative to said axis and for expansion radially outwardly thereof, said second ring including portions between said opposite ends thereof spanning said at least two corners radially inwardly thereof, and said cutting die head including means interengaging with said spanning portions to detachably secure said cutting die head in said second bore.

19. A diestock assembly according to claim 18, wherein said first retaining ring is in compression in said recess, and said second retaining ring is in tension in said groove.

20. A diestock assembly according to claim 18, wherein said means including said abutment means includes circumferentially spaced apart shoulders in said groove and a projection on said second retaining ring between said shoulders.

21. A diestock assembly according to claim 18, wherein said lobe means on said first retaining ring includes three holes between said ends of said first ring, one of said lobes being diametrically opposite said ends of said first ring, and the other two of said lobes being diametrically opposite one another and equidistant from said one lobe.

22. A diestock assembly according to claim 21, wherein said means including said abutment means includes circumferentially spaced apart shoulders in said groove diametrically opposite said abutment means, and a projection on said second retaining ring between said shoulders.

23. A diestock assembly according to claim 22, wherein said leg means of said first retaining ring are arcuate and said spanning portions of said second retaining ring are linear.

24. A diestock assembly according to claim 23, wherein said first retaining ring is in compression in said recess, and said second retaining ring is in tension in said groove.

25. A diestock assembly comprising head means having a first bore for receiving a driven ring member, said first bore having an axis, means securing said ring member in said first bore, said ring member having a second bore coaxial with said first bore for detachably receiving a cutting die head, said second bore having inner wall means providing at least two diametrically opposed corners facing inwardly of said second bore, a circumferentially extending groove in said inner wall means, radially expandable retaining ring means in said groove, means supporting said retaining ring means in said groove against rotation relative to said axis and for expansion radially outwardly thereof, said retaining ring means including portions spanning said at least two corners radially inwardly thereof, and said cutting die head including means interegaging with said spanning portions to detachably secure said cutting die head in said second bore.

26. A diestock assembly according to claim 25, wherein said spanning portions of said expandable ring means are linear.

27. A diestock assembly according to claim 25, wherein said retaining ring means has circumferentially opposite ends and said means supporting said retaining ring means includes circumferentially spaced apart abutment means in said groove between said opposite ends.

28. A diestock assembly according to claim 27, wherein said means supporting said retaining ring means further includes interengaging means between said groove and said retaining ring means at a location circumferentially spaced from said opposite ends of said retaining ring means.

29. A diestock assembly according to claim 28, wherein said interengaging means between said groove and said retaining ring means includes circumferentially spaced shoulders in said groove and a projection on said retaining ring means between said shoulders.

30. A diestock assembly according to claim 29, wherein said spanning portions of said retaining ring means are linear.

31. A diestock assembly according to claim 28, wherein said opposite ends of said retaining ring means are spaced apart by said abutment means in said groove for said retaining ring means to be supported in tension in said groove.

32. A diestock assembly according to claim 31, wherein said interengaging means between said groove and said retaining ring means is in a location diametrically opposite said abutment means and said abutment means and said opposite ends of said retaining ring means interengage to urge said retaining ring means toward said location.

33. A diestock assembly according to claim 32, wherein said interengaging means between said groove and said retaining ring means includes circumferentially spaced shoulders in said groove and a projection on said retaining ring means between said shoulders.

34. A diestock assembly according to claim 33, wherein said spanning portions of said retaining ring means are linear.

35. A diestock assembly comprising driving means having a bore for detachably receiving a driven member, said bore having an axis and inner wall means providing at least two diametrically opposed corners facing inwardly of said bore, a circumferentially extending groove in said inner wall means, radially expandable retaining ring means in said groove, means supporting said retaining ring means in said groove against rotation relative to said axis and for expansion radially outwardly thereof, said retaining ring means including portions spanning said at least two corners radially inwardly thereof, and said driven member including means interengaging with said spanning portions to detachably secure said driven member in said bore.

36. A diestock assembly according to claim 35, wherein said spanning portions of said expandable ring means are linear.

37. A diestock assembly according to claim 35, wherein said expandable ring means has circumferentially opposite ends and said means supporting said expandable ring means includes circumferentially spaced apart abutment means in said groove between said opposite ends.

38. A diestock assembly according to claim 37, wherein said means supporting said expandable ring means further includes interengaging means between said groove and said expandable ring means at a location circumferentially spaced from said opposite ends of said expandable ring means.

39. A diestock assembly according to claim 38, wherein said interengaging means between said groove and said expandable ring means includes circumferentially spaced shoulders in said groove and a projection on said ring means between said shoulders.

40. A diestock assembly according to claim 38, wherein said opposite ends of said expandable ring means are spaced apart by said abutment means in said groove for said expandable ring means to be supported in tension in said groove.

41. A diestock assembly according to claim 40, wherein said interengaging means between said groove and said expandable ring means is in a location diametrically opposite said abutment means, and said abutment means and said opposite ends of said expandable ring means interengage to urge said expandable ring means toward said location.

42. A diestock assembly according to claim 41, wherein said interengaging means between said groove and said expandable ring means includes circumferentially spaced shoulders in said groove and a projection on said ring means between said shoulders.

43. A diestock assembly according to claim 42, wherein said spanning portions of said expandable ring means are linear.

* * * * *

UNITED STATES PATENT AND TRADEMARK OFFICE
CERTIFICATE OF CORRECTION

PATENT NO. : 4,752,163

DATED : June 21, 1988

INVENTOR(S) : Gregory R. Fedor

It is certified that error appears in the above-identified patent and that said Letters Patent is hereby corrected as shown below:

Title Page, Item [57] ABSTRACT, line 11, "carriers" should read --- carries ---. Column 9, line 53, "received" should read --- receive ---. Column 12, line 31 actual (claim 21, line 3), "holes" should read --- lobes ---.

Signed and Sealed this

Twenty-seventh Day of March, 1990

Attest:

JEFFREY M. SAMUELS

Attesting Officer

Acting Commissioner of Patents and Trademarks